United States Patent
Kozlowski et al.

(10) Patent No.: US 8,999,495 B2
(45) Date of Patent: Apr. 7, 2015

(54) RECORDING MATERIAL FOR ELECTROPHOTOGRAPHIC PRINTING METHOD

(75) Inventors: Christoph Kozlowski, Osnabruck (DE); Andreas Overberg, Osnabruck (DE); Rainer Steinbeck, Osnabruck (DE)

(73) Assignee: Schoeller Technocell GmbH & Co. KG, Osnabrück (DE)

( * ) Notice: Subject to any disclaimer, the term of this patent is extended or adjusted under 35 U.S.C. 154(b) by 0 days.

(21) Appl. No.: 13/825,239

(22) PCT Filed: Sep. 15, 2011

(86) PCT No.: PCT/EP2011/066025
§ 371 (c)(1),
(2), (4) Date: May 7, 2013

(87) PCT Pub. No.: WO2012/038322
PCT Pub. Date: Mar. 29, 2012

(65) Prior Publication Data
US 2013/0216808 A1 Aug. 22, 2013

(30) Foreign Application Priority Data

Sep. 20, 2010 (EP) .................................... 10177636

(51) Int. Cl.
| | |
|---|---|
| *B41M 5/00* | (2006.01) |
| *B44C 1/17* | (2006.01) |
| *G03G 7/00* | (2006.01) |
| *B32B 27/32* | (2006.01) |
| *C08K 3/22* | (2006.01) |
| *B32B 27/10* | (2006.01) |
| *B32B 7/02* | (2006.01) |
| *B32B 27/20* | (2006.01) |
| *B32B 27/08* | (2006.01) |

(52) U.S. Cl.
CPC ................ *G03G 7/004* (2013.01); *B32B 27/32* (2013.01); *C08K 3/22* (2013.01); *B32B 27/10* (2013.01); *B32B 7/02* (2013.01); *B32B 27/20* (2013.01); *B32B 27/08* (2013.01); *G03G 7/0013* (2013.01); *G03G 7/0046* (2013.01)

(58) Field of Classification Search
CPC .......... B32B 7/02; B32B 27/08; B32B 27/10; B32B 27/20; B32B 27/32; B32B 29/00; B32B 2250/04; B32B 2307/21; B32B 2307/72; C08K 3/22
USPC ........... 428/195.1, 206, 211.1, 218, 220, 328, 428/329, 331, 332, 500, 537.5, 689
See application file for complete search history.

(56) References Cited

U.S. PATENT DOCUMENTS

| | | | |
|---|---|---|---|
| 2002/0136865 A1* | 9/2002 | Ogino et al. ................... | 428/195 |
| 2002/0182435 A1* | 12/2002 | Migliorini et al. ............. | 428/626 |
| 2005/0019583 A1* | 1/2005 | Goto et al. ...................... | 428/421 |
| 2005/0064152 A1* | 3/2005 | Aylward et al. ............. | 428/195.1 |
| 2006/0198970 A1* | 9/2006 | Tamagawa .................. | 428/32.22 |
| 2007/0218256 A1* | 9/2007 | Tani ........................... | 428/195.1 |
| 2011/0027505 A1* | 2/2011 | Majumdar et al. .......... | 428/32.52 |

OTHER PUBLICATIONS

ISK—Ishihara Sangyo Kaisha, LTD. 2012.*
HP, "Expertise in Printing: The New Laser Papers from HP", May 13, 2005, retrieved from the internet at h41131.www4.hp.com/Backgrounder_Neue_Laser-Papiere.pdf on Aug. 31, 2010.

* cited by examiner

*Primary Examiner* — Betelhem Shewareged
(74) *Attorney, Agent, or Firm* — Honigman Miller Schwartz and Cohn LLP; Thomas A. Wootton; Jonathan P. O'Brien

(57) ABSTRACT

A recording material for electrophotographic printing methods from a base paper coated on both sides with synthetic resin and having a toner-receiving layer arranged on at least one side, containing a water-soluble or water-dispersible binder in the toner-receiving layer, preferably an ethylene-acrylate polymer or an ethylene-acrylate copolymer, a finely particulate inorganic pigment and an antistatic component, such that images using both liquid toners and dry toners can be produced with this recording material, identical in both appearance and haptics to silver halide photographs.

9 Claims, No Drawings

RECORDING MATERIAL FOR ELECTROPHOTOGRAPHIC PRINTING METHOD

CROSS-REFERENCE TO RELATED APPLICATIONS

This U.S. Application claims the benefit of PCT Application No. PCT/EP2011/066025, filed on Sep. 15, 2011, which claims priority to European Application Serial No. 10177636.7 filed Sep. 20, 2010. The entire contents of the aforementioned applications are incorporated herein by reference in their entireties.

FIELD OF THE INVENTION

The present invention relates to a recording material with which images of photographic quality can be produced using electrophotographic printing methods.

BACKGROUND OF THE INVENTION

The laser printer is based on the principle of electrophotography. In electrophotography, a latent image is generated from electric charges by imaging, i.e., exposing a photoconductor with the optical image of an original document, and then using this latent image subsequently to apply a toner selectively (developing) and to produce an image (copy) of the original on paper, for example. A distinction is made between direct and indirect electrophotography as well as between wet and dry electrophotography. The wet methods, also known as liquid toner methods, use a suspension of the toner in an aliphatic solvent having a low dielectric constant and as the developer, whereas the dry method uses a toner powder. Using a bundled laser beam and a rotating mirror, an image of the desired page is recorded on the photosensitive drum. The drum has a negative charge at first, so the charge is cancelled at locations where the laser beam strikes. The shape of the discharged areas on the drum corresponds to that in the subsequent printout. The toner is applied to the drum via a roller using negatively charged toner which adheres to the discharged areas on the drum.

In the dry toner method, the paper is then guided over the drum, barely touching the drum in passing over it. A potential field is built up behind the paper. The toner is transferred to the paper, where it is initially in loose form. The toner is then fused under pressure with the help of a hot roller. The drum is discharged and excess toner is removed from it.

In the liquid toner method, the toner suspension is first transferred to a heated rubber cylinder or belt on which the liquid carrier evaporates and the toner is plastified. The toner image is then transferred from this intermediate drum to the recording sheet.

The images created with the help of a laser printer should achieve a quality comparable to that of a photograph. This includes properties such as gloss, stiffness and opacity, a high resolution and definition as well as a good light fastness.

Multilayer coated papers having an "open" porous surface on both sides are described in the publication by HP (Hannelore Breuer): Expertise in Printing: The New Laser Papers from HP (dated May 13, 2005, available at h41131.www4.hp.com/Backgrounder_Neue_Laser-Papiere.pdf (status of 31 Aug. 2010). However, images produced using such paper have a different surface gloss and significantly different haptics in comparison with traditional silver halide images.

To come closer to the goal of a photographic quality, electrophotographically generated images are produced on carrier materials that have the haptics and appearance of a typical silver salt photograph. DE 44 35 350 C1 describes an image-receiving material for electrophotography comprising a base paper coated with thermoplastics and a toner-receiving layer plus an antistatic rear side layer. One disadvantage of this method is that it requires further improvement with regard to toner fixation and the behaviour in the printer. In addition, after an image has been printed, such materials have interfering glossy spots originating from the oily substances which are frequently used as releasing agents in toner formulations.

SUMMARY OF THE INVENTION

It is therefore the object of the present invention to provide a recording material which can be printed on both sides and has a good image quality, good light fastness and ozone resistance during storage and good feed and transport behaviour in the printer while also being stackable.

This problem is solved by a recording material for electrophotographic printing methods, comprising a base paper coated on both sides with synthetic resin and at least one toner-receiving layer disposed on a synthetic resin layer such that the toner-receiving layer contains a water-soluble or water-dispersed binder, a finely particulate inorganic pigment and an antistatic component.

The synthetic resin-coated paper preferably has a specific surface topography, expressed by a roughness value Rz of 0.03 to 15 μm. The toner-receiving layer may contain a mixture of a toner-receiving ethylene-acrylic acid copolymer, a finely particulate oil-absorbing pigment and an electrically conductive substance, wherein the electrically conductive substance is an electrically conductive, finely particulate oxide or an electrically conductive polymer.

DETAILED DESCRIPTION OF THE INVENTION

For the purposes of the invention, the term "base paper" is understood to be an uncoated or surface-sized paper. A base paper may contain, in addition to cellulose fibres, sizing agents such as alkyl ketene dimers, fatty acids and/or fatty acid salt, epoxidized fatty acid amides, alkenyl or alkyl succinic acid anhydride, wet strength additives, such as polyamine-polyamide-epichlorohydrin, dry strength additives such as anionic, cationic or amphoteric polyamides or cationic starches, optical brighteners, fillers, pigments, dyes, foam suppressants and other additives known in the paper industry. The base paper may be surface-sized. Suitable sizing agents for this purpose include, for example, polyvinyl alcohol or oxidized starch. The base paper may be produced on a Fourdrinier or Yankee paper machine (cylinder-type paper machine). The grammage of the base paper may be 50 to 250 g/m$^2$, in particular 80 to 180 g/m$^2$. The base paper may be used in compacted or uncompacted form (smoothed). Base paper with a density of 0.8 to 1.2 g/cm$^3$, in particular 0.90 to 1.1 g/cm$^3$, is especially suitable. For example, the cellulose fibres used may consist of, for example, leaf bleached kraft pulp (LBKP), northern bleached kraft pulp (NBKP), leaf bleached sulphite pulp (LBSP) or northern bleached sulphite pulp (NBSP). Cellulose fibres recovered from waste paper may also be used. The aforementioned cellulose fibres may also be used in mixed form and fractions of other fibres; for example, synthetic fibres may also be added. However, cellulose fibres of 100% hardwood pulp are preferred for use. The average fibre length of the unground pulp is preferably 0.6 to 0.85 mm (Kajaani measurement). Furthermore, the cellulose has a lignin content of less than 0.05% by weight, in particular 0.01% to 0.03% by weight, based on the mass of the cellulose.

Examples of fillers that may be used in the base paper include kaolins, calcium carbonate in its natural forms such as limestone, marble or dolomite rock, precipitated calcium carbonate, calcium sulphate, barium sulphate, titanium dioxide, talc, silica, aluminium oxide and mixtures thereof. Calcium carbonate with a grain size distribution in which at least 60% of the particles are smaller than 2 µm and at most 40% are smaller than 1 µm are especially suitable. In a special embodiment of the invention, calcite with a grain size distribution in which approx. 25% of the particles have a particle size of less than 1 µm and approx. 85% of the particles have a particle size of less than 2 µm is used.

In one embodiment of the invention, a pigment-containing layer may be arranged between the base paper and the synthetic resin layer. The pigment may be a metal oxide, silicate, carbonate, sulphide or sulphate. Pigments such as kaolins, talc, calcium carbonate and/or barium sulphate are especially suitable. A pigment with a narrow grain size distribution in which at least 70% of the pigment particles are less than 1 µm in size is especially preferred. The fraction of the pigment with the narrow grain size distribution in the total quantity of pigment amounts to at least 5% by weight, in particular 10% to 90% by weight. Especially good results are achieved with a fraction of 30% to 80% by weight of the total pigment. According to the present invention, a pigment having a narrow grain size distribution is also understood to include pigments with a grain size distribution in which at least approx. 70% by weight of the pigment particles are less than approx. 1 µm in size, and the difference between the pigment with the largest grain size (diameter) and the pigment with the smallest grain size is less than approx. 0.4 µm in 40% to 80% by weight of these pigment particles. A calcium carbonate with a d50% value of approx. 0.7 µm has proven to be especially advantageous.

In a special embodiment of the invention, a pigment mixture consisting of the aforementioned calcium carbonate and kaolin may be used in the pigment-containing layer. The quantity ratio of calcium carbonate to kaolin is preferably 30:70 to 70:30. The quantity ratio of binder to pigment in the pigment-containing layer may be 0.1 to 2.5, preferably 0.2 to 1.5, but in particular approx. 0.9 to 1.3. Any known water-soluble and/or water-dispersible binder may be used in the pigment-containing layer. In addition to latex binders, film-forming starches such as thermally modified starches, in particular corn starches or hydroxypropylated starches, are especially suitable for this purpose. The pigment-containing layer can be applied inline or offline using any of the conventional applicator devices used in paper production, where the quantity is selected so that after drying the coating weight is 0.1 to 30 g/m², in particular 1 to 20 g/m², or according to one especially preferred embodiment, 2 to 8 g/m². In a preferred embodiment the pigment-containing layer is applied with a size press or a film press integrated into the paper machine.

The synthetic resin layers arranged on both sides of the base paper (front and back synthetic resin layers) may preferably contain a thermoplastic polymer. Polymers that are especially suitable for this purpose include polyolefins, for example, low-density polyethylene (LDPE), high-density polyethylene (HDPE), polypropylene, 4-methyl-1-pentene and mixtures thereof as well as polyesters, for example, polycarbonates. In a special embodiment of the invention, the thermoplastic polymer is a biodegradable polymer and/or a polymer based on renewable raw materials, for example, a linear polyester, thermoplastically modified starch or polylactic acid or a mixture of these polymers with one another or with other polymers.

In another especially preferred embodiment of the invention, the front and back synthetic resin layers contain at least 40% by weight HDPE with a density of more than 0.95 g/cm³, in particular 60 to 80% by weight. A composition consisting of 65% by weight HDPE with a density of more than 0.95 g/cm³ and 35% by weight LDPE with a density of less than 0.935 g/cm³ is especially preferred.

The synthetic resin layers may contain white pigments, such as titanium dioxide and other additives, such as optical brighteners, dyes and dispersant agents. In a special embodiment of the invention, antistatic substances, in particular electrically conductive inorganic pigments, are added to the synthetic resin layers.

The coating weight of the synthetic resin layers may be 5 to 50 g/m², in particular 5 to 30 g/ml, but preferably 10 to 20 g/m². The synthetic resin layer may be extruded in one layer onto the base paper or the pigment-containing layer or may be co-extruded in multiple layers. The extrusion coating may be performed at machine speeds of up to 600 m/min.

The surface structure (topography) of the synthetic resin layers is created with the help of the cooling cylinders used in extrusion coating. These cylinders can be characterized by their roughness values. The cooling cylinders used to create the surface structure are produced by known methods. For this purpose, the surface of a steel cylinder can be treated by blasting it with sand, glass or some other blasting material and then chrome-plated. The surface of the cylinder may also be built up electrolytically in a chromium salt bath.

In one embodiment of the invention, the synthetic resin layers may be applied symmetrically to both sides of the base paper, i.e., the synthetic resin layers on both sides of the base paper have the same composition and are identical with regard to the surface topography. According to the present invention, the surface of the synthetic resin layer on both sides may have roughness values Rz of 0.03 to 15 µm.

In a preferred embodiment of the invention, which is directed at a recording material having a glossy surface which is equivalent to a glossy silver halide photograph, the surface of the synthetic resin layer has a roughness value Rz of 0.03 to 1.8 µm. In another preferred embodiment of the invention, the goal of which is the production of a recording material having a structured surface equivalent to that of a matte silver halide photograph, the surface of the synthetic resin layer has a roughness value Rz of 9 to 15 µm on at least one side.

In another preferred embodiment of the invention, the goal of which is to obtain a glossy recording material that can be printed on one side, the synthetic resin layer has a lower roughness on the side of the recording material having the toner-receiving layer which is intended for printing than on the rear side. In this embodiment, the roughness values Rz of the side intended for printing are from 0.03 to 1.8 µm or from 9 to 15 µm, while the roughness values Rz on the side not intended for printing are from 12 to 16 µm.

According to the invention, a toner-receiving layer is applied to the side of the synthetic resin-coated base paper provided for printing. In the special embodiment of the invention, which has as its goal producing a recording material that can be printed on both sides, the toner-receiving layer is applied to both sides of the synthetic resin-coated base paper.

The toner-receiving layer consists of at least one water-soluble or water-dispersible binder, a finely particulate pigment and an antistatic agent.

The binder in the toner-receiving layer may be any conventional binder for paper coating, but the preferred binders for use here include starch, polyvinyl alcohol, acrylates or copolymers of acrylates with other monomers. Especially preferred binders include ethylene-acrylic acid copolymers, in particular those with a melting range of 70° C. to 100° C.

The finely particulate pigment in the toner-receiving layer according to the present invention is a finely particulate inorganic pigment, for example, silicon dioxide, aluminium oxide, aluminium oxide hydrate, aluminium silicate, calcium carbonate, zinc oxide, tin oxide, antimony oxide, titanium dioxide, indium oxide or a mixed oxide of these oxides. In an especially preferred embodiment, the finely particulate pigment is zinc oxide, tin oxide, antimony oxide, titanium dioxide, indium oxide or a mixed oxide of these oxides. The finely particulate pigments may be present individually or as mixtures in the toner-receiving layer.

The finely particulate pigments in the toner-receiving layer preferably have an average particle size of less than 1000 nm, especially preferably less than 200 nm. In particular pigments with a BET surface area of 30 $m^2/g$ to 400 $m^2/g$ are preferred. Pigments according to the invention can be obtained by the flame method or by wet chemical precipitation methods.

The antistatic agent in the toner-receiving layer according to the present invention may be an electrically conductive polymer or an electrically conductive pigment. Mixtures of antistatic agents may also be used.

Electrically conductive polymers according to the invention may be those in which the electric charge is transported in the form of ions such as polystyrene sulfonic acid. However, polymers in which the electric charge is transported in the form of electrons or defect electrons, for example, polyanilines, polythiophenes or others are preferred. Especially preferred as the conductive polymer is poly(3,4-ethylenedioxythiophene) (PEDOT:PSS), doped with polystyrene acid and available under the brand name CLEVIOS® or ORGACON®, for example. The electrically conductive polymers according to the invention are contained in the toner-receiving layer in an amount of 0.1 to 50% by weight, in particular 1.0 to 4.0% by weight, based on the weight of the dried layer. If a polymer is used as the antistatic agent in the toner-receiving layer according to the invention, it may replace some or all of the water-soluble or water-dispersible binder in a special embodiment of the invention.

Conductive pigments according to the invention may consist of metal powder or carbon, for example. However, oxides such an antimony oxide, tin oxide, indium oxide or especially preferably titanium dioxide or zinc oxide or mixed oxides of the elements antimony, indium, titanium, zinc or tin are preferred. The conductive pigments according to the invention preferably have an average particle size of less than 1000 nm, especially preferably less than 200 nm. If a conductive pigment is used as the antistatic agent, it may also at the same time constitute the finely particulate pigment of the toner-receiving layer in a preferred embodiment of the invention.

In another embodiment of the invention, the toner-receiving layer additionally contains anionic or nonionic surface-active agents in an amount of 0.01 to 4.0% by weight, in particular 0.05 to 2.5% by weight, based on the dried layer.

The toner-receiving layer may optionally also contain additional additives, for example, matting agents, dyes, crosslinking agents, lubricants, antiblocking agents and other conventional additives.

The coating composition to form the toner receiver layer may be applied inline or offline using any the conventional application systems used in papermaking, where the amount is selected so that after drying, the coating weight amounts to at most 3 $g/m^2$, in particular 0.1 to 2 $g/m^2$, or according to an especially preferred embodiment, 0.3 to 0.7 $g/m^2$. This coating composition may be applied as a coating with the help of a conventional applicator mechanism integrated into the extrusion coating line. For example, a 3-roller application or application by a squeegee device is especially suitable for this purpose.

In another embodiment of the present invention, additional layers such as protective layers or gloss-enhancing layers may be applied to the toner-receiving layer. The coating weight of such layers is preferably less than 1 $g/m^2$.

The following examples serve to further illustrate the present invention.

EXAMPLES

A base paper A was prepared from eucalyptus pulp. For refining, the pulp as an approx. 5% aqueous suspension (thick matter) was beaten with the help of a refiner to a degree of beating of 36° SR. The average fibre length was 0.64 mm. The concentration of cellulose fibres in the thin matter was 1% by weight, based on the weight of the cellulose suspension. Additives such a cationic starch were added to the thin matter in an amount of 0.4% by weight, and alkyl ketene dimer (AKD) was added as the neutral sizing agent in an amount of 0.48% by weight, polyamine-polyamide-epichlorohydrin resin (Kymene®) was added in an amount of 0.36% by weight as a wet strength additive and a natural $CaCO_3$ was added in an amount of 10% by weight. The amounts specified are based on the weight of the pulp. The thin matter, the pH of which was set at approx. 7.5, was applied to the wire screen of the paper machine from the head box, whereupon the sheets were formed with drainage of the sheeting in the wire section of the paper machine. The additional drainage of the paper web to a water content of 60% by weight based on the weight of the web was performed in the press section. The additional drying was performed in the dry wire of the paper machine using heated drying cylinders. The result was a base paper with a grammage of 160 $g/m^2$ and a moisture content of approx. 7%.

The base paper was then coated on both sides with a coating weight of 15 $g/m^2$ on each side using a coating composition comprised of a styrene-acrylate binder, starch and a pigment mixture of calcium carbonate and kaolin, then was dried and next was smoothed using a calender. The resulting material is identified below as base paper A.

The base paper B was produced in the same way as base paper A from eucalyptus pulp. However, it additionally contains titanium dioxide in the pulp dispersion in an amount such that the base paper web contained 10% by weight $TiO_2$ based on dry solids after completion. This base paper B was used directly for the subsequent extrusion coating without application of another coating composition.

Both sides of base papers A and B were coated in a extrusion laminator at a speed of approx. 250 m/min with a coating weight of approx. 20 $g/m^2$ using a polyethylene-titanium dioxide mixture of 20% by weight of a low-density polyethylene (LDPE, 0.923 $g/cm^3$), 70% by weight of a high-density polyethylene (HDPE, d=0.964 $g/cm^3$), 10% by weight titanium dioxide (rutile). The cooling cylinders were selected so that the resulting surfaces of both sides would have a roughness of 0.9 µm, measured as the Rz value according to DIN 4768. The resulting materials were subsequently identified as A1 and B1 and had a high-gloss surface on both sides.

In the same way, base papers A and B were extrusion-coated with the same polyethylene-titanium dioxide mixture but the cooling cylinders were selected so that the resulting surfaces of the side intended for subsequent printing would have a roughness Rz of 11.2 µm. For the side not intended for printing, a cooling cylinder that imparts a roughness Rz of 14.1 μm to this side was selected. The resulting materials are referred to below as A2 and B2 and have a matte structured surface on the side intended for printing.

Both surfaces of the resin-coated papers A1 and B1 and the surface of the resin-coated papers A2 and B2 intended for printing were coated with coating mixture after being treated with a corona discharge and subsequently dried. The coating weight of the coating mixture was selected to yield a dry application of 0.5 g/m². The composition of the coating mixture is given below.

Coating Composition a (Comparison)

To 27.9 g of an ethylene-acrylate dispersion (MICHEM PRIME® 4990 R.E. obtainable from the company Michelman, Belgium) with a polymer content of 35.7% by weight was added 0.1 g SURFYNOL® 440 wetting agent (obtainable from Air Products, Netherlands) and 72 g water.

Coating Composition b (Invention)

22.4 g MICHEM PRIME® 4990 R.E. ethylene-acrylate dispersion was mixed with 9.8 g dispersion of a finely particulate conductive pigment (antimony-doped tin oxide FS-10D, solids content 20.5%, manufacturer ISK ISHIHARA SANGYO KAISHA Ltd., Japan) and 0.1 g SURFYNOL® 440 wetting agent and 67.7 g water.

Coating Composition c (Invention)

A dispersion of 3.0 g of a conductive pigment (antimony-doped titanium-tin oxide FT-2000, manufacturer ISK ISHIHARA SANGYO KAISHA Ltd., Japan) in 27 g water was prepared and treated by means of a rotor-stator mixing system (ULTRA-TURRAX® from the company IKA®, Germany) until the average particle size of the pigment was 180 nm. To the dispersion such obtained 22.4 g MICHEM PRIME® 4990 R.E. ethylene-acrylate dispersion, 0.1 g SURFYNOL® 440 wetting agent and 47.5 g water were added.

Coating Composition d (Comparison)

2 g polyvinyl alcohol (Mowiol® 40-88, obtainable from Kuraray Specialties GmbH Europe, Germany) was mixed with 60 g of a dispersion of AEROXIDE® ALU C (manufacturer Evonik Degussa AG, Germany) with a solids content of 30% by weight, 0.1 g SURFYNOL® 440 wetting agent and 37.9 g water.

Coating Composition e (Invention)

16.3 g MICHEM PRIME® 4990 R.E. ethylene-acrylate dispersion was mixed with 29.0 g of a dispersion of AEROSIL® 300 (manufacturer Evonik Degussa AG, Germany) with a solids content of 20% by weight, 3 g of a dispersion of polystyrene sulfonic acid (VERSA® TL 130, manufacturer Akzo Nobel Surface Chemistry AB, Sweden, polymer content 30% by weight), 0.1 g SURFYNOL® 440 wetting agent and 51.6 g water.

Coating Composition f (Invention)

13.3 g MICHEM PRIME® 4990 R.E. ethylene-acrylate dispersion was mixed with 29.0 g of a dispersion of AEROSIL® 300 (manufacturer Evonik Degussa AG, Germany) with a solids content of 20% by weight, 38.5 g of a dispersion of PEDOT:PSS (CLEVIOS® P, manufacturer H.C. Strack CLEVIOS GmbH, Germany, polymer content 1.3% by weight), 0.1 g SURFYNOL® 440 wetting agent, 5 g diethylene glycol, 2 g acrylic copolymer dispersion GLASCOL® LE 520, and 12.1 g water.

The resulting recording materials were subjected to the tests described below.

Surface Resistance

Measured with a comb electrode according to DIN 53483, results given in log(Ohm/cm).

Sticking Test:

Two sheets of the carrier material of DIN-A4 size are stacked one above the other at 23° C. and 50% relative humidity and loaded with a 10-kg weight. After 65 hours, the sheets are separated manually and the sticking/jamming is evaluated.

+: no sticking,
o: slight sticking,
−: severe sticking.

Toner Adhesion:

The recording materials are printed using an electrophotographic printer of the type HP® Indigo® 6000 and the adhesion of the toner was evaluated at 23° C., 50% relative humidity, by gluing and then removing an adhesive strip of the TESA 4104 type.

+: toner layer remains undamaged,
o: toner layer delaminated slightly,
−: toner layer completely delaminated from the substrate.

Visual Evaluation of the Print on Glossy Spots:

The recording materials were printed using an electrophotographic printer of the type HP® Indigo® 6000 and the print image was evaluated visually.

+: no glossy spots,
−: glossy spots discernible.

The test results are summarized in Table 1 below.

TABLE 1

| Recording material | | Surface resistance | Bonding test | Toner adhesion | Glossy spots |
|---|---|---|---|---|---|
| A1a | Comparison | >14.9 | ○ | ○ | − |
| A1b | Invention | 12.1 | + | + | + |
| A1c | Invention | 7.6 | + | + | + |
| A1d | Comparison | >14.9 | + | − | + |
| A1e | Invention | 12.6 | + | + | + |
| A1f | Invention | 8.6 | + | + | + |
| B1a | Comparison | >14.9 | ○ | ○ | − |
| B1b | Invention | 12.0 | + | + | + |
| B1c | Invention | 7.6 | + | + | + |
| B1d | Comparison | >14.9 | + | − | + |
| B1e | Invention | 12.5 | + | + | + |
| B1f | Invention | 8.5 | + | + | + |
| A2a* | Comparison | >14.9 | ○ | ○ | − |
| A2b* | Invention | 12.1 | + | + | + |
| A2c* | Invention | 7.5 | + | + | + |
| A2d* | Comparison | >14.9 | + | − | + |
| A2e* | Invention | 12.5 | + | + | + |
| A2f* | Invention | 8.6 | + | + | + |
| B2a* | Comparison | >14.9 | ○ | ○ | − |
| B2b* | Invention | 12.0 | + | + | + |
| B2c* | Invention | 7.7 | + | + | + |
| B2d* | Comparison | >14.9 | + | − | + |
| B2e* | Invention | 12.3 | + | + | + |
| B2f* | Invention | 8.4 | + | + | + |

*For the recording materials intended for printing on both sides, the test results were essentially identical for both sides, so the average of the two sides is given.

In addition, printing results with the printers that use dry toners, i.e., IGen® 3 from XEROX® and NeXpress® from Kodak® were performed.

Table 2 below shows the test results (averages for the 3 printers). The transfer of toner to the recording sheet was evaluated visually on the basis of the uniformity of homogeneously printed ink areas, where "+" stands for good uniformity, "o" stands for slight fluctuations in density and "−" stands for severe fluctuations in density in the print image.

| Recording material | | Toner transfer | Toner adhesion | Glossy spots |
|---|---|---|---|---|
| A1a | Comparison | − | ○ | − |
| A1b | Invention | ○ | + | + |

-continued

| Recording material | | Toner transfer | Toner adhesion | Glossy spots |
|---|---|---|---|---|
| A1c | Invention | + | + | + |
| A1d | Comparison | − | − | + |
| A1e | Invention | ◯ | + | + |
| A1f | Invention | + | + | + |
| B1a | Comparison | − | ◯ | − |
| B1b | Invention | + | + | + |
| B1c | Invention | + | + | + |
| B1d | Comparison | − | − | + |
| B1e | Invention | ◯ | + | + |
| B1f | Invention | + | + | + |
| A2a* | Comparison | − | ◯ | − |
| A2b* | Invention | ◯ | + | + |
| A2c* | Invention | + | + | + |
| A2d* | Comparison | − | − | + |
| A2e* | Invention | ◯ | + | + |
| A2f* | Invention | + | + | + |
| B2a* | Comparison | − | ◯ | − |
| B2b* | Invention | + | + | + |
| B2c* | Invention | + | + | + |
| B2d* | Comparison | − | − | + |
| B2e* | Invention | ◯ | + | + |
| B2f* | Invention | + | + | + |

*For the recording materials intended for printing on both sides, the test results were essentially identical for both sides, so the average of the two sides is given.

Evaluation of Results

It was found that when using the coating compositions according to the invention, recording materials that can be printed with both liquid toner and dry toner using electrophotographic printing methods are obtained. The resulting images have an appearance comparable to that of silver halide images and have comparable haptics. Adhesion of the toner to the surface is good with the recording materials according to the invention, the sheets do not stick together and do not develop an electrostatic charge but they do yield a uniform transfer of toner when using dry toners. Glossy spots due to drops of the oils used as additives in the toners are reliably prevented.

The invention claimed is:

1. A recording material for electrophotographic printing methods, consisting essentially of a base paper coated with synthetic resin on both sides and at least one toner-receiving layer arranged on a synthetic resin layer, wherein the toner-receiving layer contains a water-soluble or water-dispersible binder, a finely particulate inorganic pigment selected from an oxide of titanium, zinc, tin, antimony or a mixed oxide of two or more of these elements having an average particle size of less than 200 nm and a BET surface area of 30 $m^2$/g to 400 $m^2$/g, and an electrically conductive polymer as an antistatic component.

2. The recording material according to claim 1, wherein the synthetic resin layers contain polyolefin.

3. The recording material according to claim 2, wherein the synthetic resin layers contain a mixture of polyethylene with a density of more than 0.95 g/$cm^3$ and a polyethylene with a density of less than 0.95 g/$cm^3$.

4. The recording material according to claim 3, wherein a polyethylene with a density of >0.95 g/$m^3$ is present in the synthetic resin layers in an amount of 60% by weight to 80% by weight, based on the total polyolefin weight.

5. The recording material according to claim 1, wherein the toner-receiving layer contains an ethylene-acrylate polymer or ethylene-acrylate copolymer as the water-dispersible binder.

6. The recording material according to claim 1, wherein the finely particulate pigment is an electrically conductive pigment.

7. The recording material according to claim 1, wherein the electrically conductive polymer is polystyrene sulfonic acid.

8. The recording material according to claim 1, wherein the electrically conductive polymer is a polyaniline or a polythiophene.

9. The recording material according to claim 1, wherein the finely particulate pigment has an average particle size of 10 nm to 2 μm.

* * * * *